US011951069B2

(12) United States Patent
Tran et al.

(10) Patent No.: US 11,951,069 B2
(45) Date of Patent: Apr. 9, 2024

(54) FOOT SPA WITH DISPOSABLE PUMP

(71) Applicant: Gulfstream Inc., Cambridge (CA)

(72) Inventors: Minh Sang Tran, Cambridge (CA); Chris Alexander, Cambridge (CA)

(73) Assignee: Gulfstream Inc., Cambridge (CA)

( * ) Notice: Subject to any disclaimer, the term of this patent is extended or adjusted under 35 U.S.C. 154(b) by 302 days.

(21) Appl. No.: 17/021,004

(22) Filed: Sep. 15, 2020

(65) Prior Publication Data

US 2021/0361527 A1 Nov. 25, 2021

Related U.S. Application Data

(60) Provisional application No. 63/027,737, filed on May 20, 2020.

(51) Int. Cl.

*A61H 33/00* (2006.01)
*A47K 3/022* (2006.01)
*A61H 33/04* (2006.01)

(52) U.S. Cl.

CPC ........... *A61H 33/005* (2013.01); *A47K 3/022* (2013.01); *A61H 33/0087* (2013.01); *A61H 33/04* (2013.01); *A61H 2033/046* (2013.01); *A61H 2201/1207* (2013.01); *A61H 2201/1215* (2013.01); *A61H 2201/1238* (2013.01); *A61H 2205/12* (2013.01)

(58) Field of Classification Search

CPC ... A61H 33/005; A61H 33/0087; A47K 3/022
USPC .................................................... 4/574.1, 662
See application file for complete search history.

(56) References Cited

U.S. PATENT DOCUMENTS

| | | | | |
|---|---|---|---|---|
| 2,542,896 | A * | 2/1951 | Brady, Jr. | F04D 13/08 415/228 |
| 3,802,804 | A * | 4/1974 | Zimmermann | F04D 13/026 417/420 |
| 4,982,461 | A * | 1/1991 | Mikiya | A61H 33/6047 4/541.3 |
| 8,944,786 | B1 * | 2/2015 | McDougall | A61H 33/0091 4/541.3 |
| 9,205,023 | B2 | 12/2015 | Tran et al. | |
| 10,219,977 | B2 * | 3/2019 | Tran | H02K 49/108 |
| 10,278,894 | B1 * | 5/2019 | Le | A61H 33/6047 |
| 2004/0062648 | A1 * | 4/2004 | Makinson | F04D 25/0653 416/241 A |

(Continued)

*Primary Examiner* — David P Angwin
*Assistant Examiner* — William R Klotz
(74) *Attorney, Agent, or Firm* — MaxGoLaw PLLC

(57) ABSTRACT

The foot spa has a rotating drive hub and a pump. The hub has North and South pole domains encircling a rotation axis in alternating relation. The pump includes a housing and an impeller, the housing having a pair of sides and defining: a cavity having a center and a periphery; an intake that communicates with the cavity center; and one or more ports communicating with the periphery. The impeller is mounted in the cavity and: defines blades which are adapted, upon rotation of the impeller in the cavity, to draw water through the intake and eject water through the one or more ports; and includes a portion that is ferromagnetic and a portion that is not ferromagnetic, the portions: being adapted such that rotation of the drive hub causes rotation of the impeller and abutting one another, one being axially displaced from the other.

10 Claims, 11 Drawing Sheets

(56) References Cited

U.S. PATENT DOCUMENTS

| | | | | |
|---|---|---|---|---|
| 2010/0239435 | A1* | 9/2010 | Le | F04F 5/10 417/54 |
| 2011/0253236 | A1* | 10/2011 | Le | F04F 5/10 417/151 |
| 2014/0020684 | A1* | 1/2014 | Klasek | A61M 16/16 128/203.26 |
| 2014/0234143 | A1* | 8/2014 | Marks | F04D 29/0465 417/420 |
| 2015/0352004 | A1* | 12/2015 | Konstantakis | A61H 33/6063 4/507 |
| 2017/0159661 | A1* | 6/2017 | Gieras | F04D 1/02 |

* cited by examiner 52
62
63
60
62
53
42
48
40
54
57
56
50

58
58
50
11
42
58
58
63
52

FOOT SPA WITH DISPOSABLE PUMP

FIELD

The invention relates to the field of pedicures.

BACKGROUND

In the field of esthetics, foot spas are well known. A typical foot spa has a chair, a basin containing water into which the feet of a person seated on the chair can be immersed and a pump for circulating the water.

SUMMARY OF THE INVENTION

Forming one aspect of the invention is a spa. This spa comprises a basin, a motor, a drive hub and a pump.

The basin is for containing water.

The motor is mounted exteriorly of the basin and has a rotating element defining an axis.

The drive hub is disposed exteriorly of the basin and is coupled to the rotating element for movement therewith, the drive hub having magnetic properties such that, in the absence of externalities, a magnetic field is produced which extends from and returns to the hub, the magnetic field being characterized in that, if depicted graphically, concentrations of field lines would appear to extend from one or more North pole domains defined in the surface to one or more South pole domains defined in the surface, the North and South pole domains being spaced apart from each other and arranged to encircle the rotation axis in alternating relation.

The pump includes a housing and an impeller.

The housing is disposed interiorly of the basin and has a pair of sides, one of the pair presenting towards and abutting the basin and the other of the pair opposed in orientation to the one of the pair. The housing defines: a cavity having a center and a periphery; an intake that communicates with the center of the cavity; and one or more ports defined in the other of the pair of sides and communicating with the periphery. The cavity has a generally cylindrical portion The impeller: is mounted in the cavity; defines blades which are adapted, upon rotation of the impeller, to draw water through the intake and eject water through the one or more ports; and includes a portion that is ferromagnetic and a portion that is not ferromagnetic, the portions (i) being adapted such that rotation of the drive hub causes rotation of the impeller and (ii) abutting one another, one being axially displaced from the other.

According to another aspect, the portions can abut one another at a junction that is generally circular.

According to another aspect, the ferromagnetic portion can define the blades.

According to another aspect, the ferromagnetic portion can be steel.

According to another aspect, the ferromagnetic portion can be a steel stamping.

According to another aspect, the portion that is not ferromagnetic can be aluminum.

According to another aspect, the ferromagnetic portion can have a thickness X10, the portion that is not ferromagnetic can have a thickness X1, X10 can be between about 0.1 mm and 0.2 mm and X1 can be between about 0.9 mm and 2.0 mm.

According to another aspect, X10 can be about 0.15 mm and X1 can be about 2 mm.

DETAILED DESCRIPTION

Figure 1:
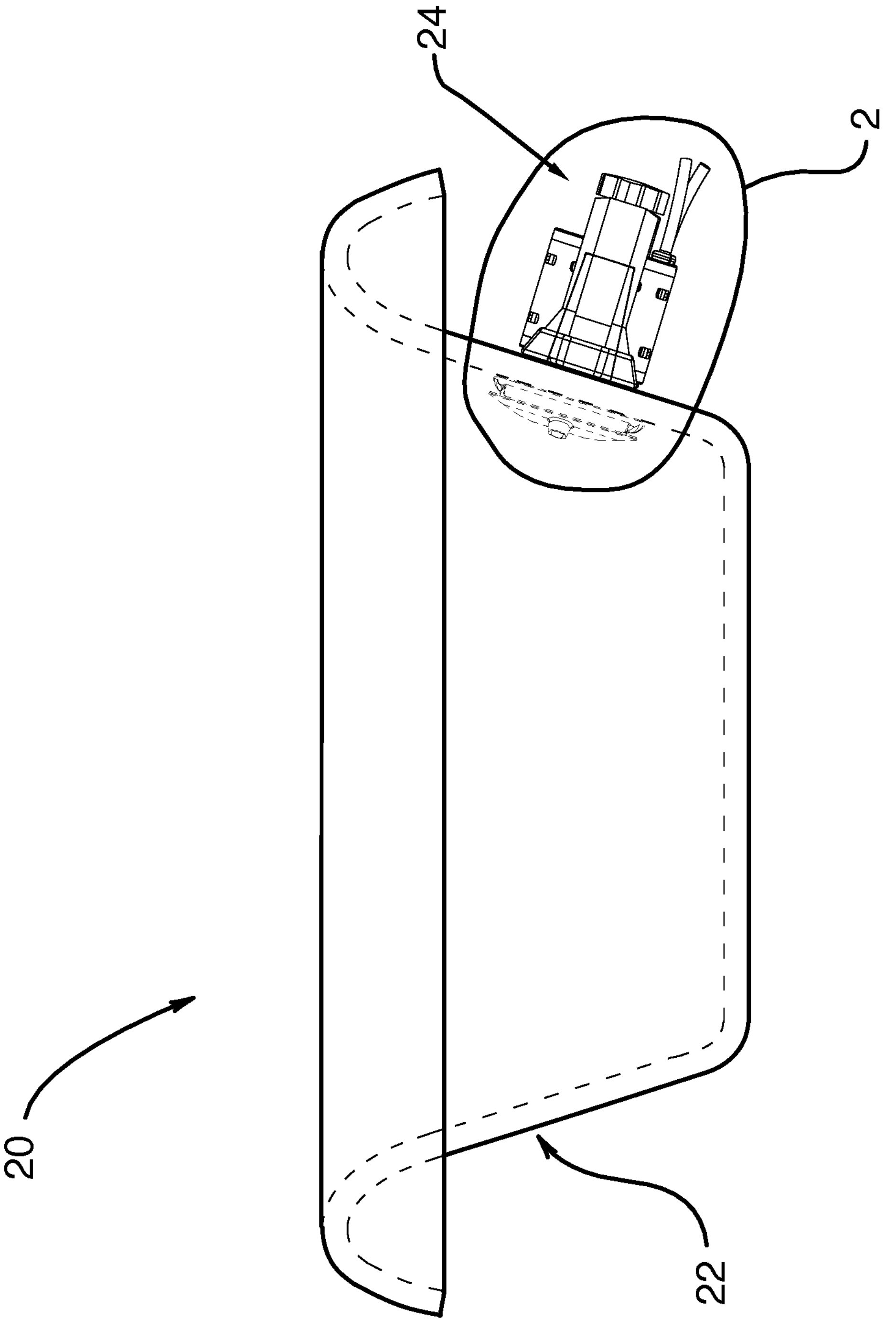
FIG. 1 is a view of a spa according to a non-limiting embodiment of the invention, portions shown in phantom for clarity.
Figure 2:
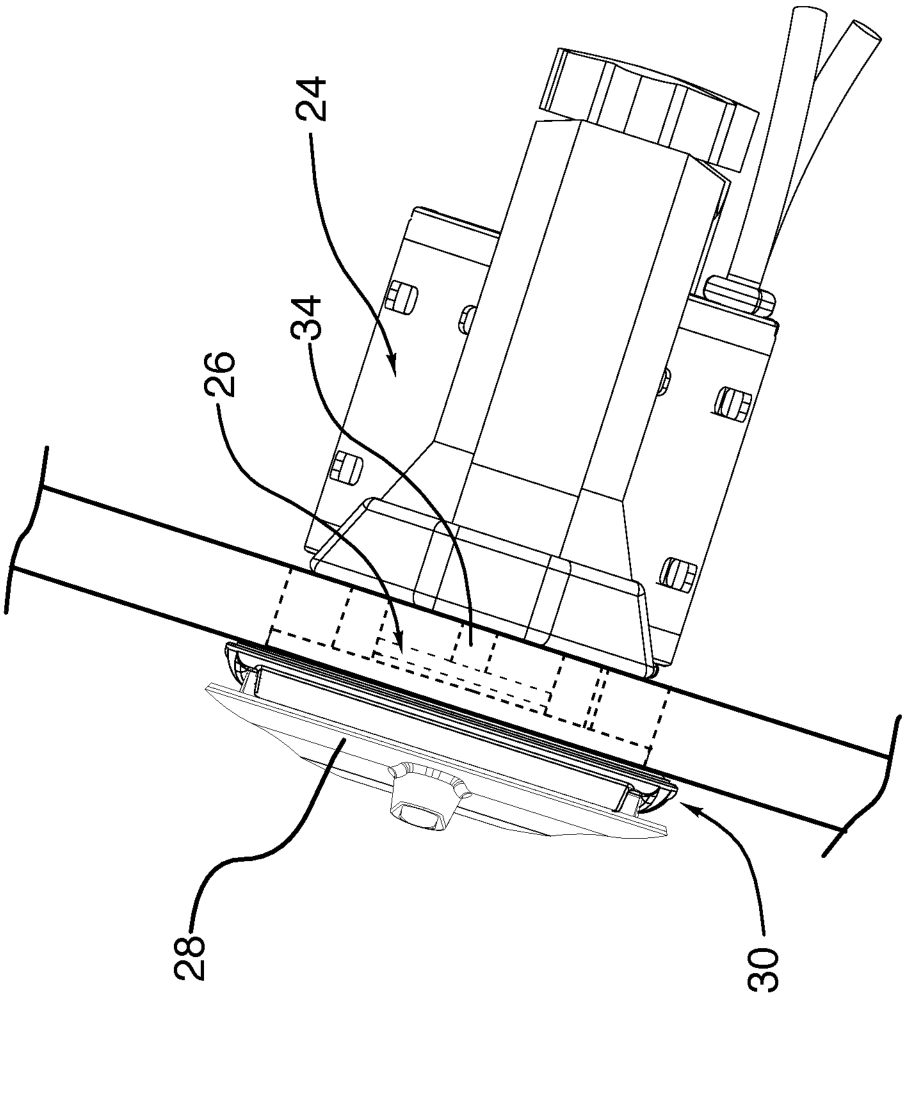
FIG. 2 is a partial phantom view of the structure of encircled area 2 of FIG. 1.

Shown in FIG. 1 is a spa 20 comprising a basin body 22 and a motor 24. As seen in FIG. 2, spa further comprises a drive hub 26, a pump 28 and a pump mount 30.

Figure 3A:
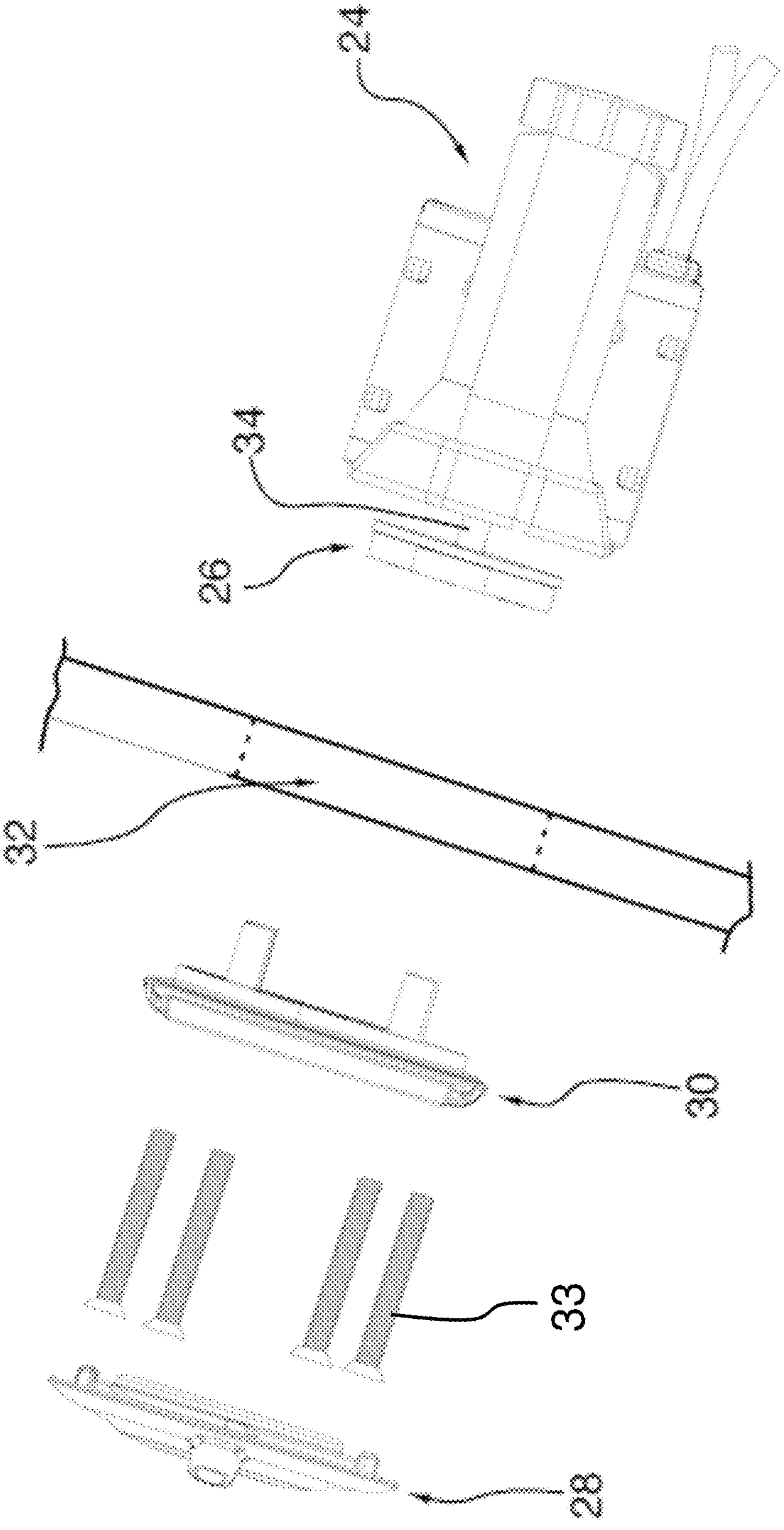
FIG. 3A is an exploded view of the structure of FIG. 2.
Figure 3B:
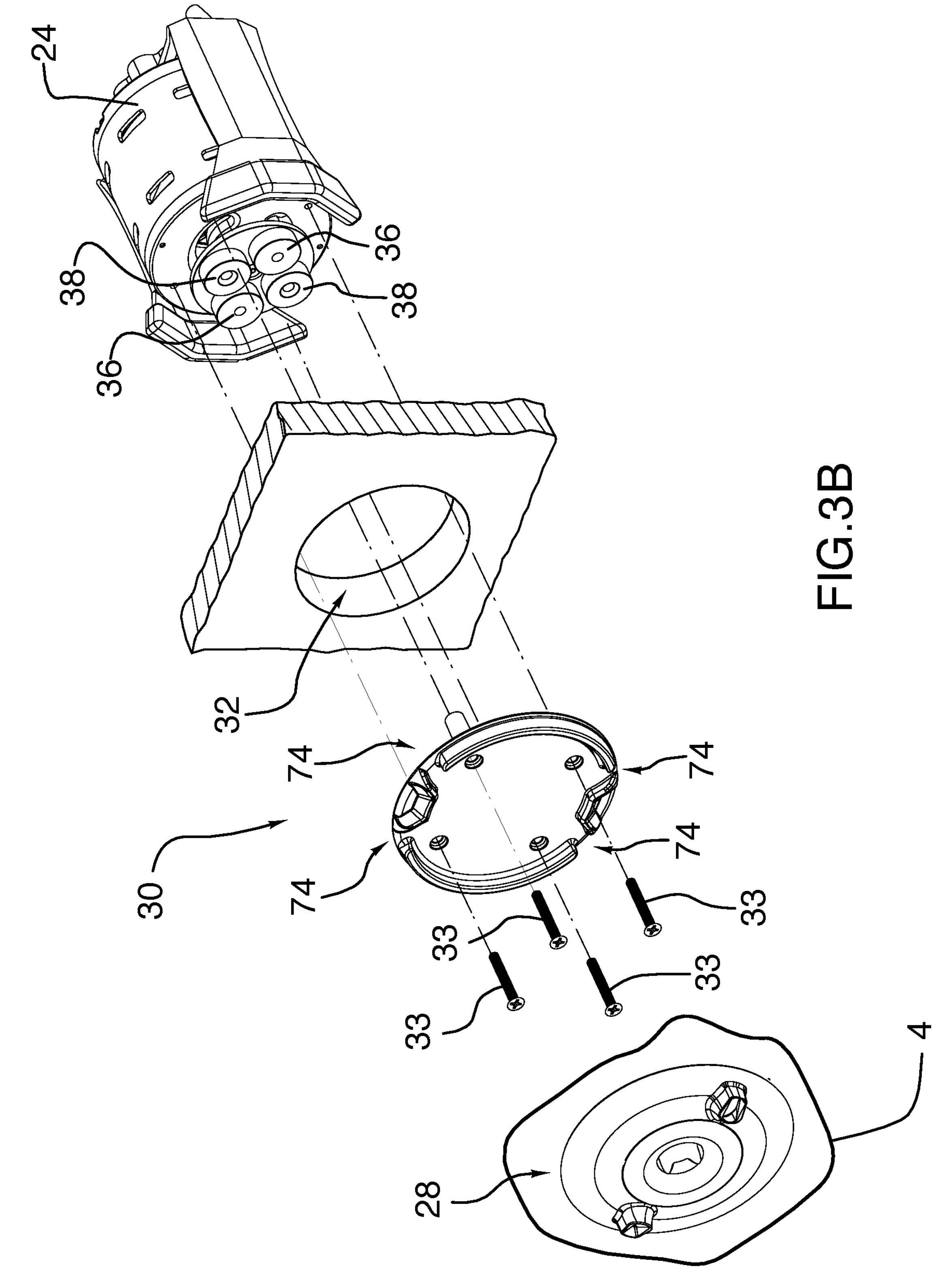
FIG. 3B is another view of the structure of FIG. 3A.
Figure 6:
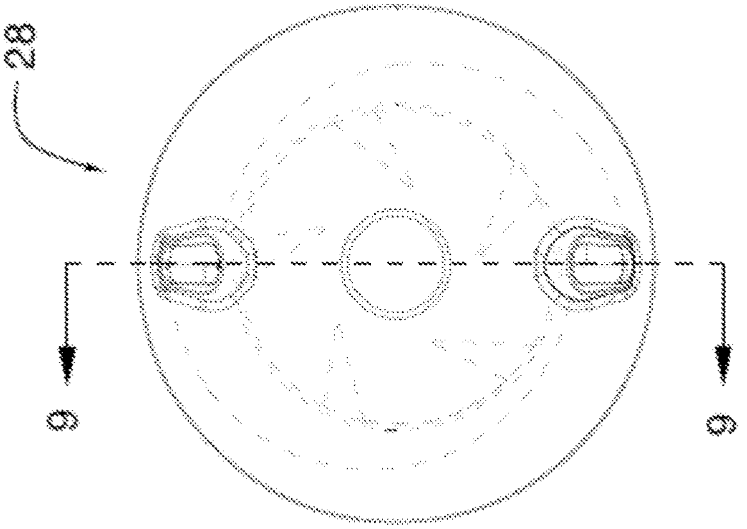
FIG. 6 is another view of the structure of FIG. 4.
Figure 5:
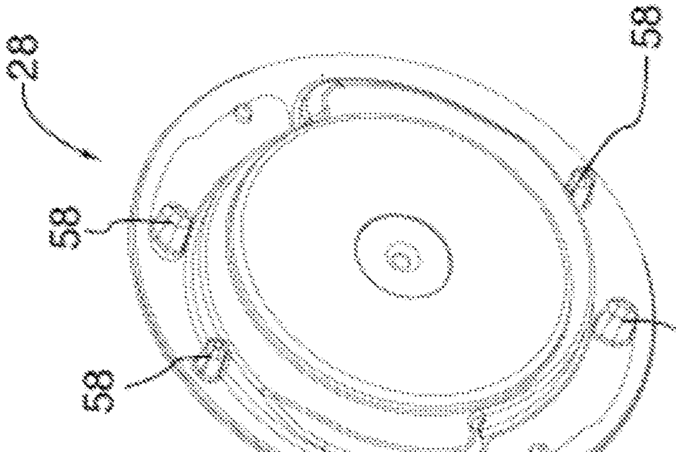
FIG. 5 is another view of the structure of FIG. 4.
Figure 4:
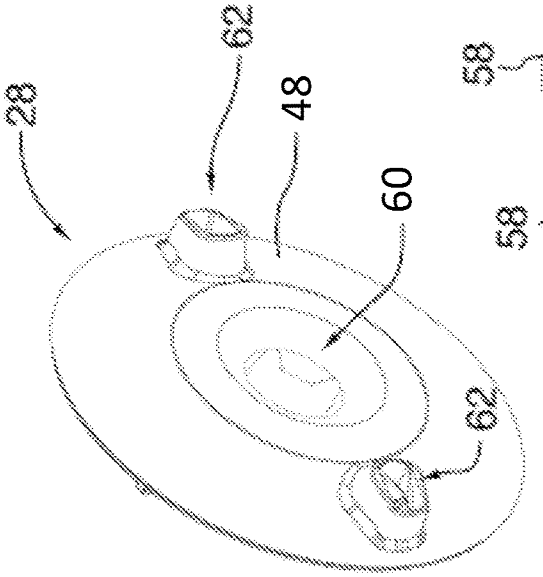
FIG. 4 is a view of encircled area 4 of FIG. 3B.
Figures 7, 8:
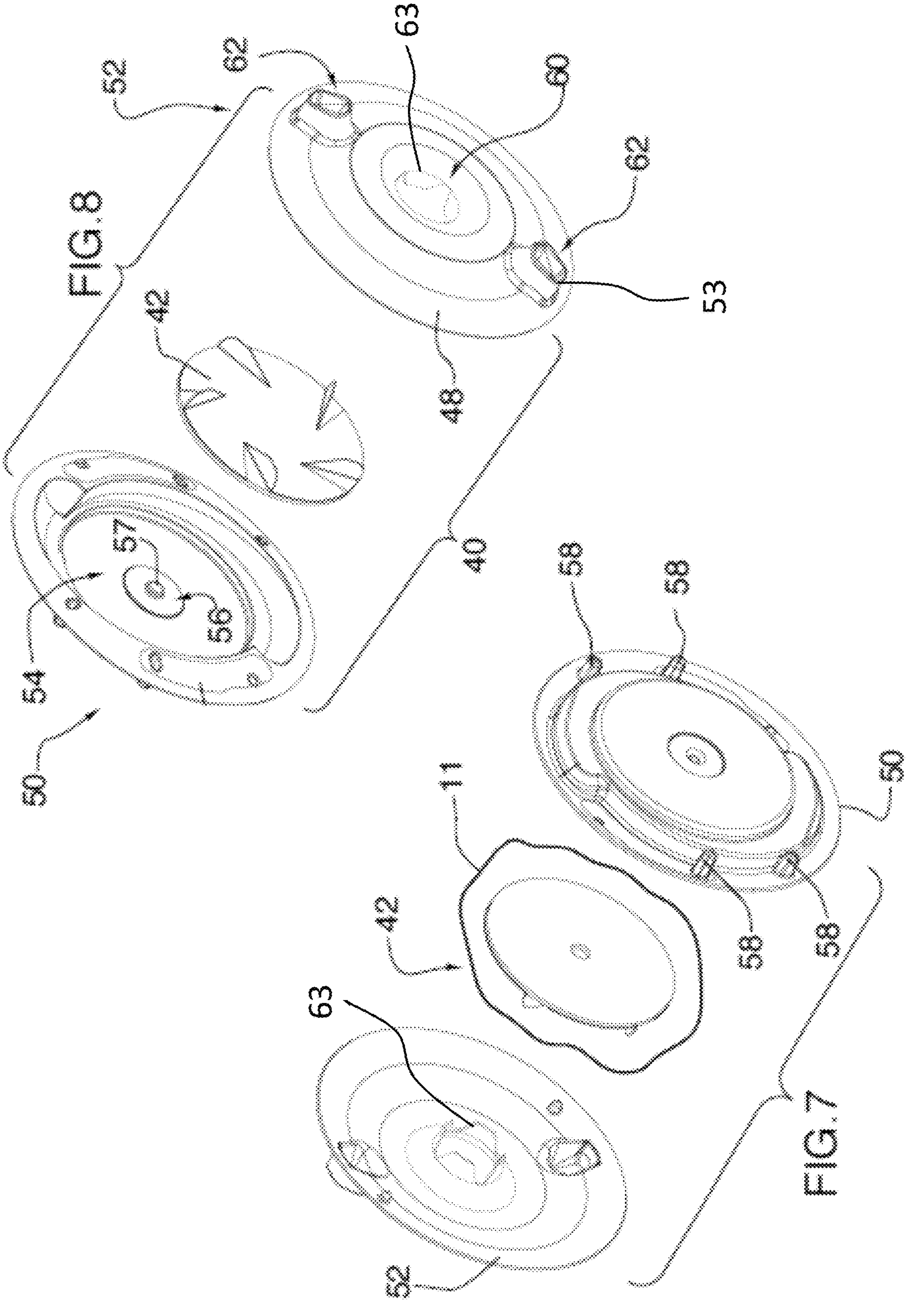
FIG. 7 is an exploded view of the structure of FIG. 4.
FIG. 8 is another view of the structure of FIG. 7.
Figure 9:
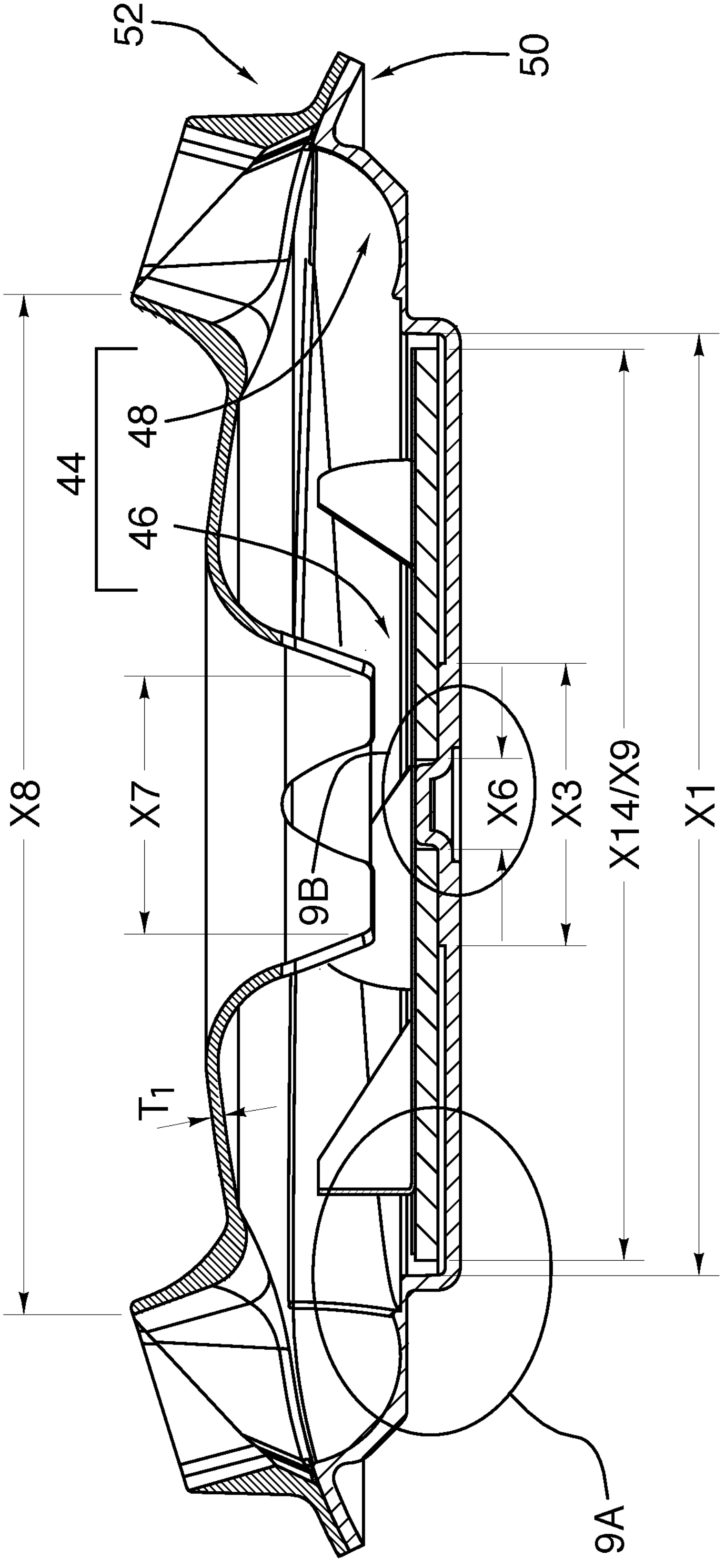
FIG. 9 is a view along section 9-9 of FIG. 6.
Figure 9B:
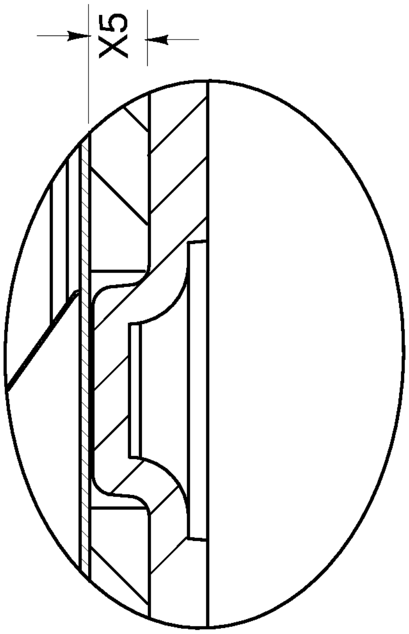
FIG. 9B is a view of detail 9B of FIG. 9.
Figure 9A:
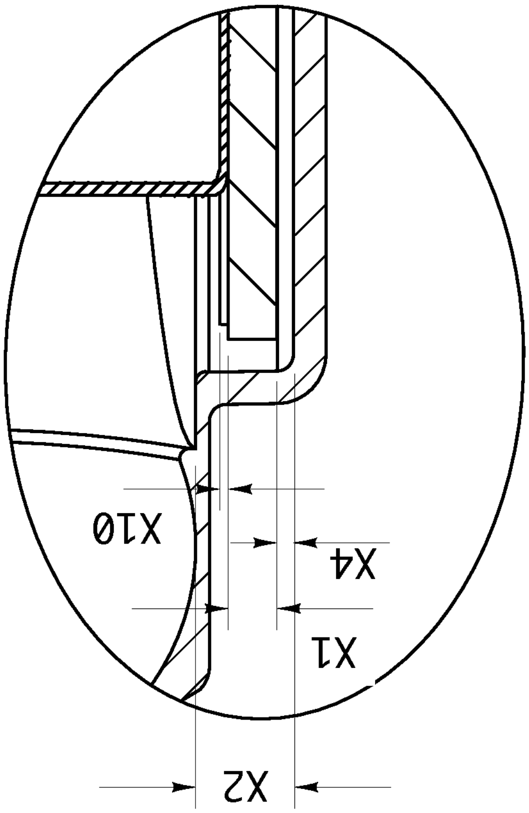
FIG. 9A is a view of detail 9A of FIG. 9.
Figure 10:
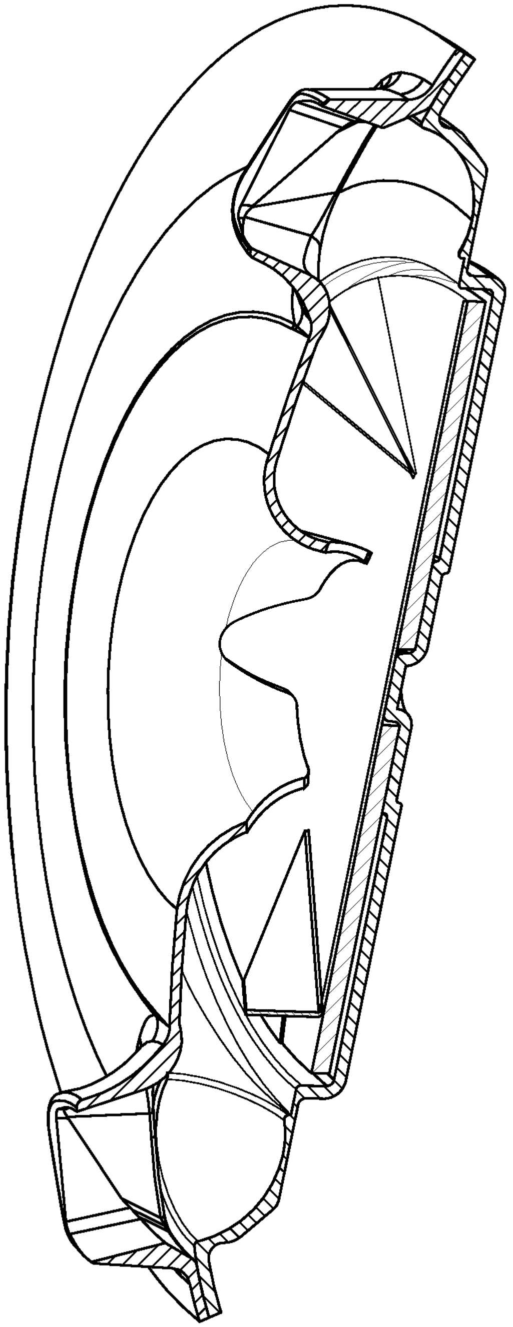
FIG. 10 is another view of the structure of FIG. 9.
Figure 12:
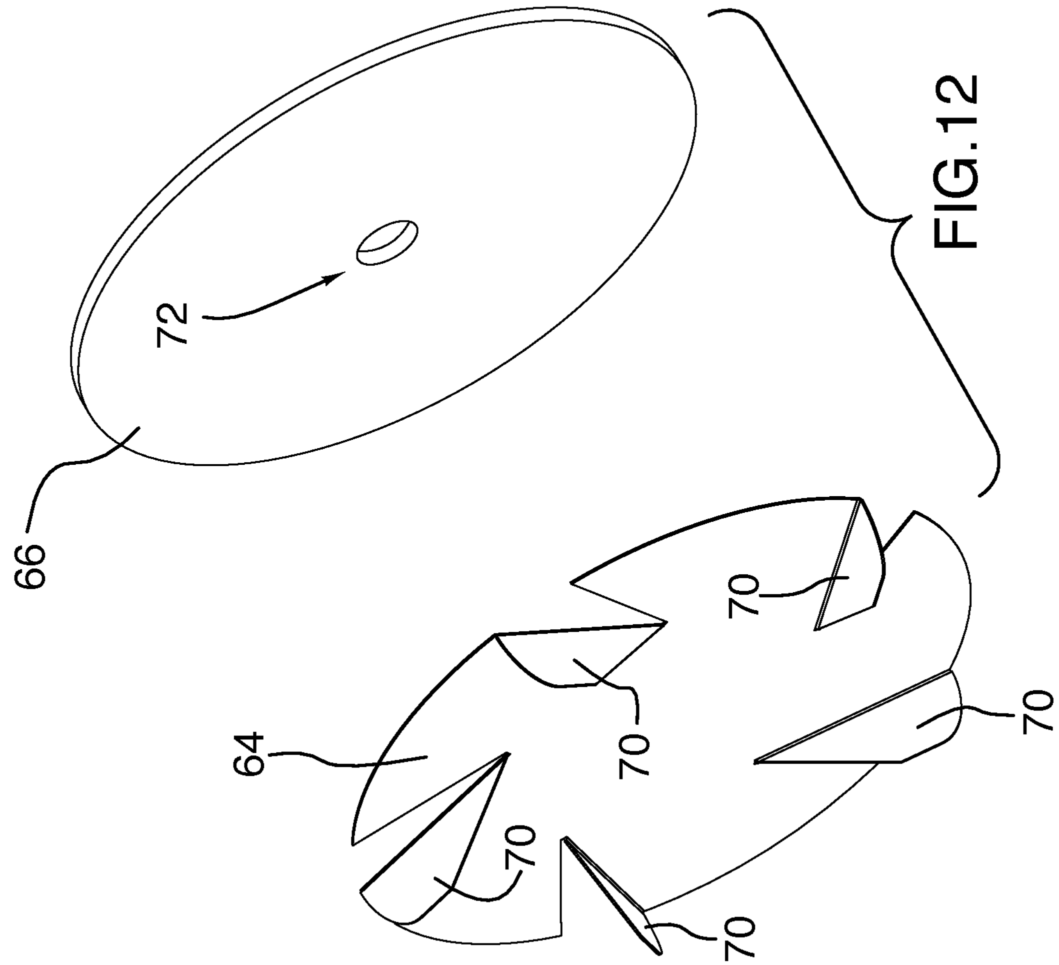
FIG. 12 is an exploded view of the structure of FIG. 11.
Figure 11:
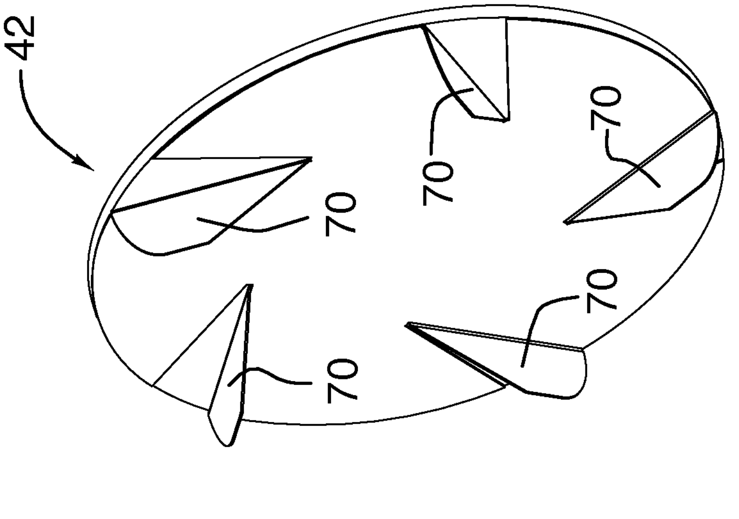
FIG. 11 is a view of the structure of encircled area 11 of FIG. 7.
Figure 13:
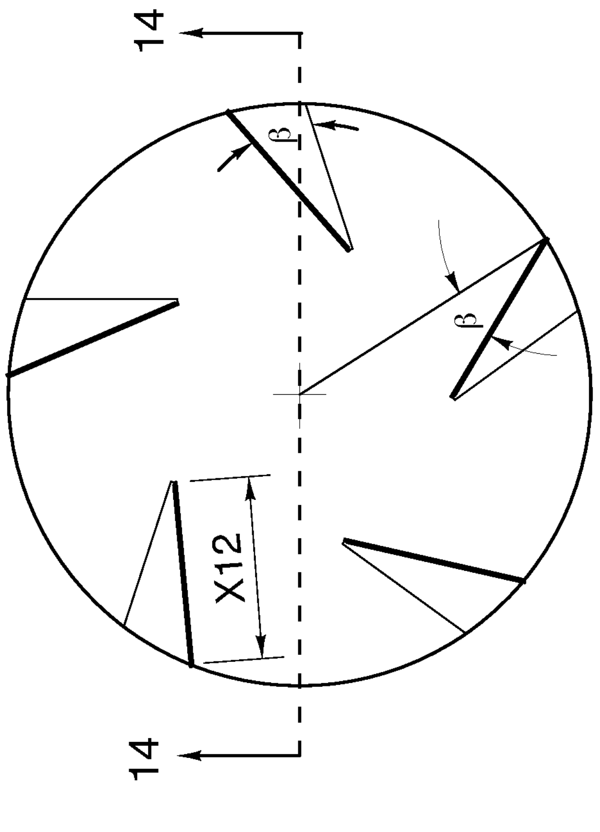
FIG. 13 is another view of the structure of FIG. 11.
Figure 14:
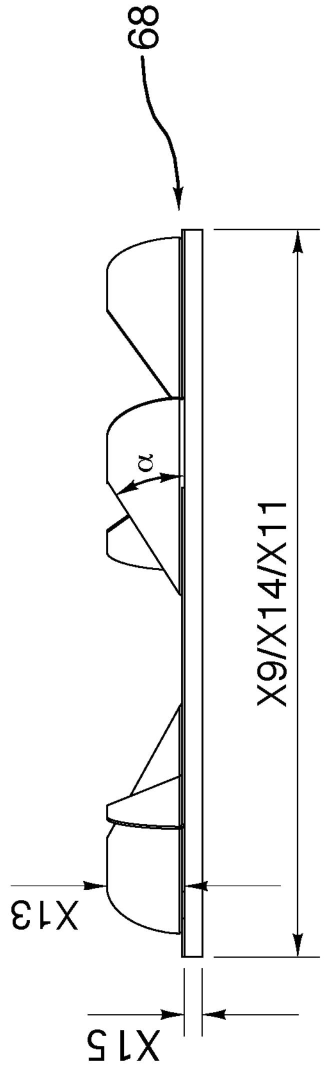
FIG. 14 is a view along section 14-14 of FIG. 13.

Basin body 22 is constructed of fiberglass and, in combination with pump mount 30, defines a basin for containing a volume of water that is about 35 cm×35 cm×35 cm, which, it will be appreciated, is sufficient to cover the feet of a patron seated for a pedicure. As best seen in FIG. 3B, basin body 22 has an aperture 32 which is occluded in use by pump mount 30.

The motor 24 is a 1/24 horsepower AC brushless motor disposed exteriorly of the basin and mounted to the motor mount 30 by screws 33 and has a rotating element 34, to wit, a shaft, defining an axis, adapted for rotation between about 2000 and 3000 RPM. The motor rotates at about 3300 RPM when unloaded.

The drive hub 26 is disposed exteriorly of the basin and is coupled to the rotating element for movement therewith, the drive hub having two North Pole domains 36 and two South pole 38 domains arranged to encircled the rotation axis in alternating relation. Each domain is a Neodymium magnet having a mass of about 21 grams and N50 gauss.

As shown in FIGS. 4-14, pump 28 includes a housing 40 and an impeller 42.

The housing 40 is constructed of LDPE plastic, has a total mass of about 33 grams, is disposed interiorly of the basin in use, defines a cavity 44 having a total volume of about 52 ml, a center 46 and a periphery 48, and has a pair of parts 50, 52, each having a thickness T1 of about 0.80 mm, one 50 of the pair presenting towards and abutting the basin and the other 52 of the pair opposed in orientation to the one of the pair. The center 46 of the cavity is generally round and the periphery includes a pair of lobes 53 that generally encircle the center 46 and expand outwardly in the manner of a nautilus shell.

The one 50 of the pair of parts has a pair of sides and defines:

- on one side, a circular recess 54 presenting towards the cavity 44 and having a diameter X1 of 1.5 mm and a depth X2 of 3.8 mm a boss 56 protruding from the base of the recess, the boss having a diameter X3 of 20.1 mm and a height X4 of 1.3 mm a pintle 57 protruding from the boss, the pintle having a height X5 of 1.0 mm and a diameter X6 of 6.0 mm on the other of the sides, a plurality of studs 58 presenting in a direction opposite to that of the pintle The other of the pair of sides defines an intake 60 that communicates with the cavity center 46 and a pair of ports 62 communicating with periphery 48, the intake 60 having a diameter X7 of 19 mm and the ports 62 being spaced from one another a distance X8 of 68.1 mm, the ports 62 being disposed on opposite sides of the intake 60, each having an area of about 84 $cm^2$ and each terminating at the end of a respective lobe 53. Intake 60 has a plurality of cut-aways 63.

The impeller includes a portion 64 that is ferromagnetic and a portion 66 that is not ferromagnetic, the portions abutting one another at a junction 68 that is generally circular and being laminated together.

The ferromagnetic portion 64 is constructed from a stamped steel disc of 201 stainless, the disc having a diameter X9 of 61 mm and a thickness X10 of 0.15 mm, the stamping being such that five blades 70 project towards the interior of the basin, each being disposed at the edge of the nominal disc, having an area of about 0.12 square inches and being generally triangular in shape, the blades extending out to a diameter X11 of about 61 mm having a total length X12 of about 20 mm, a maximum height X13 of about 6.4 mm, a taper angle α of about 45° degrees and each being disposed at an angle β of about 30° to a radius of the disc.

The portion that is not ferromagnetic is a disc of aluminum having a diameter X14 of 61 mm and a thickness X15 of 1.3 mm, such disc being disposed in the recess and having a central hole 72 through which the pintle projects.

The pump mount 30 has a plurality of sockets 74, each in receipt of one of the studs 58 of the pump 28, and is configured such that the drive hub 26 is spaced a distance of about 6 mm from the impeller 42.

In use, when immersed in a mixture of water and sand similar to the mixture in which the feet are immersed in the course of a treatment, the pump produced visible turbulence throughout the basin for about 30 minutes before it failed.

Persons of ordinary skill will readily appreciate that the foregoing is of substantial advantage, in that the product, being constructed out of relatively small amounts of commonplace materials, is relatively inexpensive, thereby to permit hygienic single use only, while at the same time, produces turbulence for a period of time sufficient to conduct a salon treatment of reasonable length.

Whereas a specific embodiment is described, variations are possible, including but not limited to:

materials other than steel, such as T2.5 tin plate or ferroplastic, can be used materials other than aluminium, such as copper, can be used the blades need not be stamped the dimensions can be varied plastics other than polycarbonate can be used the number of blades can be varied the number of ports can be varied magnets of different strength can be used the speed of rotation can be varied the number of magnets can be varied the distance between the drive hub and the impeller can vary With specific regard, only, to the thickness of the steel and aluminum discs, utility has been found, in the context of the drive hub, motor and housing described above, as per the table below. The indications of "low", "medium" and "high" represent the perceived speed of the pump as assessed by visual and auditory observations.

| | Aluminum Thickness | | |
|---|---|---|---|
| Steel Thickness | .9 mm | 1.3 mm | 2.0 mm |
| .10 mm | Speed - low | Speed - medium | Speed - low |
| .15 mm | Speed - low | Speed - med | Speed - high |

As such, the invention should be understood to be limited only by the accompanying claims, purposively construed.

The invention claimed is:

1. A spa comprising:

a basin for containing water;

a motor mounted exteriorly of the basin and having a rotating element defining an axis;

a drive hub disposed exteriorly of the basin and coupled to the rotating element for movement therewith, the drive hub having magnetic properties such that, in the absence of externalities, a magnetic field is produced which extends from and returns to the hub, the magnetic field being characterized in that, if depicted graphically, concentrations of field lines would appear to extend from one or more North pole domains defined in a surface to one or more South pole domains defined in the surface, the North and South pole domains being spaced apart from each other and arranged to encircle the rotation axis in alternating relation;

a pump including a housing and an impeller positioned within the housing, the housing being disposed in an interior of the basin and having a first side and a second side, the first side presenting towards and abutting the basin and the second side opposed in orientation to the first side, the housing defining:

a cavity formed between the first side and the second side having a center and a periphery;

an intake in the second side that communicates with the center of the cavity;

one or more ports defined in the second side and communicating with the periphery;

the impeller defining a plane being mounted in a recess of the cavity, the impeller having a set of angled blades bent from the plane and forming a void in the plane, the set of angled blades that project towards the interior of the basin which are adapted, upon rotation of the impeller in the recess, to draw water through the intake and eject water through the one or more ports;

wherein the impeller includes a first portion that is ferromagnetic and a second portion that is not ferromagnetic, the first and second portions being joined together and adapted such that rotation of the drive hub causes rotation of the impeller via the magnetic field, wherein the impeller and drive hub are axially displaced from one another, wherein the first portion and the second portion of the impeller abut one another at a junction that has a portion that is circular and planar, the first portion of the impeller being disposed entirely to one side of the planar portion of the junction; and wherein the ferromagnetic first portion defines the blades.

2. The spa according to claim 1, wherein the ferromagnetic first portion is steel.

3. The spa according to claim 2, wherein the ferromagnetic first portion is a steel stamping.

4. The spa according to claim 1, wherein the second portion that is not ferromagnetic is aluminum.

5. The spa according to claim 4, wherein the ferromagnetic first portion has a thickness X10, the second portion that is not ferromagnetic has a thickness X1, X10 is between about 0.1 mm and 0.2 mm, and X1 is between about 0.9 mm and 2.0 mm.

6. The spa according to claim 5, wherein X10 is about 0.15 mm and X1 is about 2 mm.

7. The spa according to claim 1, wherein the intake further comprises a plurality of cut-aways.

8. The spa according to claim 1, wherein there are five blades in the set of angled blades.

9. The spa according to claim 1, wherein each blade in the set of angled blades has an area of about 0.12 square inches.

10. The spa according to claim 9, wherein each blade in the set of angled blades extends out to a diameter X11 of about 61 mm having a total length X12 of about 20 mm, a maximum height X13 of about 6.4 mm, and a taper angle $\alpha$ of about 45°; and wherein each of the blades is disposed at an angle $\beta$ of about 30° to a radius of the impeller.

* * * * *